Oct. 24, 1967     P. A. LAWRENCE     3,348,275
UTILITY FASTENER
Filed Dec. 13, 1965
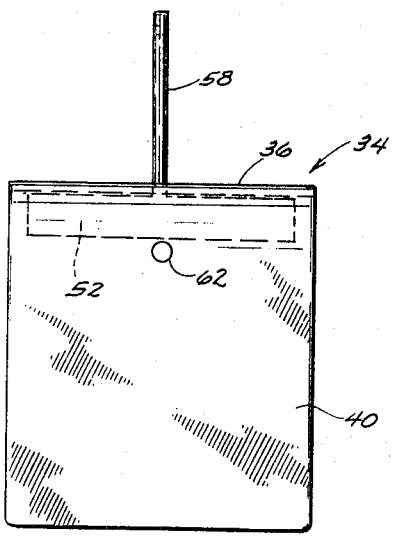
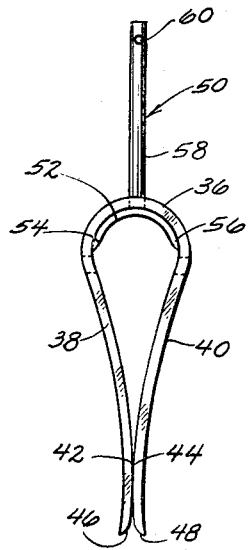
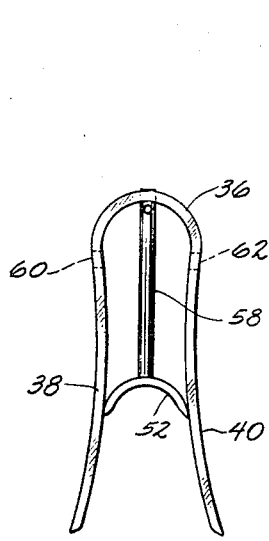
Fig. 5    Fig. 4    Fig. 3
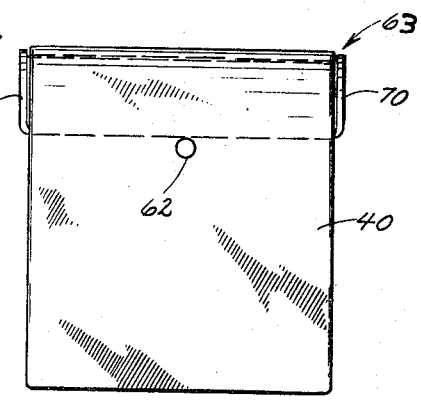
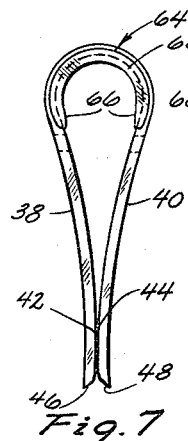
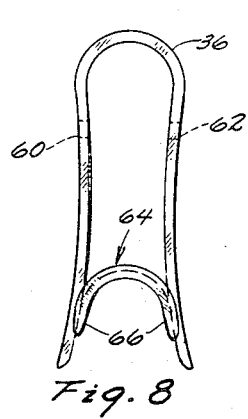
Fig. 8    Fig. 7    Fig. 6
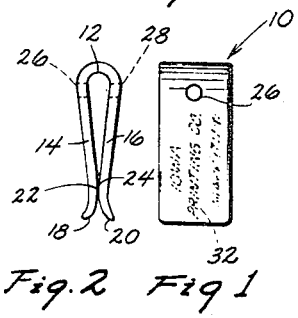
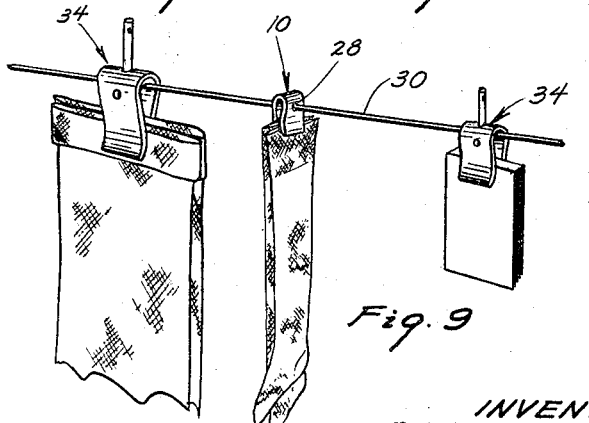
Fig. 2    Fig. 1       Fig. 9
INVENTOR
PAUL A. LAWRENCE
BY Dick, Zarley, McKee & Thomte
ATTORNEYS

United States Patent Office 3,348,275
Patented Oct. 24, 1967

3,348,275
UTILITY FASTENER
Paul A. Lawrence, 1660 Beaver, Des Moines, Iowa
Filed Dec. 13, 1965, Ser. No. 513,170
6 Claims. (Cl. 24—255)

This invention relates to a utility fastener and in particular to a clip-type fastener.

Fasteners commonly available, such as the ordinary paper clip, are formed of metal which has a number of objectionable characteristics. In a wire-type fastener, the ends of the wire will scratch or make indentations on the material which the fastener is used. The least amount of corrosion of the metal will cause the fastener to leave the stain on the material being fastened. The typical fastener cannot be used for large or small work pieces as the large fastener tends to mutilate the work pieces such as sheets of paper while the small fastener will be permanently deformed if used on too large a work piece. Additionally, no means is provided with the conventional clip fastener for spreading the clamping portions apart to prevent damage to the items being clamped and to facilitate placing the clamp on the work piece.

Accordingly, it is one of the principal objects of this invention to provide a utility fastener which is universal in its application and may be used on large or small pieces, work pieces made of all kinds of materials such as paper, cloth or the like, and will not damage or leave any impression on the material being clamped.

Another object of this invention is to provide a utility clip fastener formed from a highly resilient plastic material which may be readily used on material of varying thicknesses. A single sheet of paper for instance may be clamped as well as a dozen or more sheets of the same material.

It is still a further object of this invention to provide a utility fastener having a slide element for opening the jaws of the fastener to receive and remove the work pieces to be clamped.

A related object of this invention is to provide a clip fastener having a slidable element for opening the jaws which will not accidentally be removed from the fastener.

A still further object of this invention is to provide a clip fastener having a means for hanging the fastener from any desired supporting means including a stretched line or a hook.

A further object of this invention is to provide a utility fastener which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an elevational view of the utility fastener clip of this invention;

FIG. 2 is a side elevation view of the fastener in FIG. 1;

FIG. 3 is an elevational view of an alternate embodiment of this invention;

FIG. 4 is a side elevational view of the fastener in FIG. 3;

FIG. 5 is a side elevation view similar to FIG. 4 but illustrating the fastener in its opened condition;

FIG. 6 is an elevational view of a third embodiment of this invention;

FIG. 7 is a side elevational view of the invention of FIG. 6;

FIG. 8 is a side elevational view similar to FIG. 7 but showing the fastener in its opened condition; and FIG. 9 is a perspective view of the clip fasteners in use.

The clip fastener of this invention is referred to in FIGS. 1 and 2 by the reference numeral 10 and is formed from a length of resilient plastic material which is bent upon itself to form a bight portion 12 and a pair of jaw leg portions 14 and 16. The bight portion 12 is seen to be semi circular in shape and the leg portions 14 and 16 have outwardly flared end portions 18 and 20. Inwardly along the length of the legs 14 and 16 the legs are in clamping engagement along convex surfaces 22 and 24.

A pair of aligned holes 26 and 28 are formed in the length of plastic material adjacent the bight portion 12. A stretched line 30 may be threaded through the aligned openings 26 and 28 as seen in FIG. 9.

If desired, advertising information such as shown at 32 in FIG. 1 may be imprinted on the outer surfaces of the legs 14 and 16.

In FIGS. 3, 4 and 5 an alternate embodiment of the clip fastener is shown and referred to by the reference numeral 34. It includes a semi-circular bight portion 36 with inwardly extending leg portions 38 and 40. The legs are in yieldable engagement with each other along the radial center of inner convex surfaces 42 and 44 adjacent their outer free end portions 46 and 48 which are flared outwardly to function as guides for sliding the clip onto a work piece.

A slidable jaw opener device 50 is provided and includes a semi-circular in shape element 52 which is in mating engagement with the bight portion 36 when in its retracted position as shown in FIGS. 3 and 4. The semi-circular portion has tapered edge portions 54 and 56 which tend to merge into the curvature of the bight portion 36 and the legs 38 and 40. A circular in cross-section element 58 is fixedly secured to the backside of the slidable member 52 and extends through an opening in the center of the bight portion 36. The rod 58 has a length such that when the slidable element 52 is moved between the jaws 38 and 40 as seen in FIG. 5, the side edges of the slidable element 52 engage the jaws along a line through the radial center of the convex portion of the legs 38 and 40. It is noted that the legs 38 and 40 tend to straighten out as they are opened and thus the radial center of the convex portions is relocated inwardly toward the bight portion 36. By having the rod length 58 no longer than that described, the slidable member will always be held between the legs 38 and 40.

The rod element 58 also serves to prevent the slidable element 52 from rotating between the jaws 38 and 40. To hang the fastener 34, an opening 60 has been provided in the rod 58 at its upper end and additionally aligned openings 60 and 62 in the legs 38 and 40 may be used for mounting the fastener 34 on a stretch line 30 as in the case of the fastener 10 in FIG. 9.

The third embodiment of this invention is shown in FIGS. 6, 7 and 8 and is referred to generally by the reference numeral 63. It is similar to the fasteners of FIGS. 3, 4 and 5 except for the jaw opening device 64. Thus, similar structure is referred to by like reference numerals.

The jaw opener device 64 is arcuate in shape and includes a semi-circular portion with inwardly extending edges 66 shaped to matingly engage the inside curvature of the bight portion 36 and the legs 38 and 40 when the slidable member is in its retracted position as shown in FIG. 7. The inwardly extending edges serve to prevent accident rotation of the slidable member 64 when moved between the jaws to the open position of FIG. 8. The slidable member 64 is also provided with end flanges 68 and 70 which conform to the shape of the end edges of the bight portion 36. Their outer peripheral edges are inwardly offset from the outer surface of the bight portion 36 as seen in FIG. 7 and thereby provide a smooth outer surface along the full length of the fastener 62, but engage the end edges of the fastener to prevent removal of the slide member 64 by transverse movement within the fastener 62.

Thus it is seen in operation that the clip fastener of FIG. 1 may be easily moved into engagement with the material to be clamped by passing it between the outwardly flaring end edges 18 and 20. A completely smooth surface is provided in the area of the convex surfaces 22 and 24 and thereby eliminates the possibility of any damage to the work pieces. The fasteners may be hung in any of a number of desired ways as illustrated in FIG. 9.

The fasteners of FIGS. 3–5 and 6–8 may be opened to their positions in FIGS. 5 and 8 and when the material to be clamped is moved against the slide elements 50 and 64 respectively the slide elements will be readily moved to their retracted positions in FIGS. 4 and 7, respectively. When it is desired to remove the material being clamped, the slide elements may be moved forwardly to spread the jaws of the fasteners. If it be desired to remove the slide elements, this may also be easily accomplished.

Some changes may be made in the construction and arrangement of my utility fastener without departing from the real spirit and purpose of my invention, and it is my intention to cover by my claims, any modified forms of structure or use of mechanical equivalents which may be reasonably included within their scope.

I claim:

1. A utility fastener, comprising, a length of plastic material bent upon itself to form a bight portion and a pair of leg portions, said plastic material being flat on the inner surfaces of said leg portions along lines extending transversely of the longitudinal axis of said clip, said bight portion being arcuate in shape with said leg portions having opposing convex inner surfaces along their length, and a semicylindrical in shape slide element being disposed in said bight and means for moving said slide element longitudinally of said leg portions for spreading said leg portions apart, said slide element is formed of sheet material of substantially uniform thickness and matingly engages the inside surface of said bight portion when in a retracted position, and has a concave forward surface, said slide element having longitudinal forward side edges being tapered towards the adjacent leg portions for engagement with said legs when being moved between extended and retracted positions.

2. The structure of claim 1 and said means for moving said slide element includes an elongated portion connected to said slide element and slidably extending through said bight portion.

3. The structure of claim 2 wherein the outer end of said elongated portion is substantially flush with the outer surface of said bight portion when the forward edges of said slide element are on a line extending through the radial centers of said convex portions.

4. The structure of claim 2 wherein each of said convex surfaces on said legs are further defined as having an inner surface extending longitudinally inwardly and merging at a transversely extending tangential line into an outer outwardly extending surface, said means for moving said slide element includes stop means for limiting forward movement of said slide element beyond said tangential line.

5. The structure of claim 4 wherein said stop means is further defined by said elongated portion having a length sufficient for its outer free end to be disposed in said bight portion with its outer end surface flush with the outer surface of said bight portion.

6. A utility fastener, comprising, a length of plastic material bent upon itself to form a bight portion and a pair of leg portions, said plastic material being flat on the inner surfaces of said leg portions along lines extending transversely of the longitudinal axis of said clip, said bight portion being arcuate in shape with said leg portions having opposing convex inner surfaces along their length and a slide element is disposed in said bight and means for moving said slide element longitudinally of said leg portions for spreading said leg portions apart, said means for moving said slide element includes an elongated portion connected to said slide element and slidably extending through said bight portion, said slide element matingly engages the inside surface of said bight portion when in a retracted position, and has a concave forward surface, said slide element having longitudinal forward side edges being tapered towards the adjacent leg portions for engagement with said legs when being moved between extended and retracted positions.

References Cited

UNITED STATES PATENTS

| | | | |
|---|---|---|---|
| 327,394 | 9/1885 | Hemsley. | |
| 1,935,685 | 11/1933 | White | 24—259 X |
| 2,262,223 | 11/1941 | Chessin | 132—50.2 |
| 2,510,821 | 6/1950 | Hodson et al. | 132—50.2 |
| 2,532,674 | 12/1950 | Nelsen | 24—137 |
| 2,629,916 | 3/1953 | Footlick | 24—255 |
| 2,999,569 | 9/1961 | Wilson | 24—259 X |

WILLIAM FELDMAN, *Primary Examiner.*

D. A. GRIFFIN, *Assistant Examiner.*